US010447746B2

(12) United States Patent
Wang et al.

(10) Patent No.: US 10,447,746 B2
(45) Date of Patent: Oct. 15, 2019

(54) SYSTEM AND METHOD FOR SPATIAL ADAPTATION IN ADAPTIVE STREAMING

(71) Applicant: Futurewei Technologies Inc., Plano, TX (US)

(72) Inventors: Xin Wang, Rancho Palos Verdes, CA (US); Shaobo Zhang, Shenzhen (CN); Yongliang Liu, Beijing (CN)

(73) Assignee: Futurewei Technologies, Inc., Plano, TX (US)

( * ) Notice: Subject to any disclaimer, the term of this patent is extended or adjusted under 35 U.S.C. 154(b) by 424 days.

(21) Appl. No.: 14/444,900

(22) Filed: Jul. 28, 2014

(65) Prior Publication Data

US 2015/0032901 A1 Jan. 29, 2015

Related U.S. Application Data

(60) Provisional application No. 61/858,911, filed on Jul. 26, 2013.

(51) Int. Cl.
*G06F 15/16* (2006.01)
*H04L 29/06* (2006.01)

(52) U.S. Cl.
CPC ...... *H04L 65/4092* (2013.01); *H04L 65/4084* (2013.01)

(58) Field of Classification Search
CPC ... H04L 65/601; H04L 67/06; H04L 67/2823; G06F 17/30887; G06F 17/30643
See application file for complete search history.

(56) References Cited

U.S. PATENT DOCUMENTS 7,139,811 B2 * 11/2006 Lev Ran ................. G06F 9/546 709/226
7,246,306 B2 7/2007 Chen et al.
7,290,000 B2 * 10/2007 Meifu ................. G06F 17/3087 709/203
7,725,812 B1 5/2010 Balkus et al.
(Continued)

FOREIGN PATENT DOCUMENTS

CN 103081504 A 5/2013
EP 1764744 A2 3/2007
(Continued)

OTHER PUBLICATIONS

"Interactive ROI streaming with DASH", Canon Research Centre France and Telecom ParisTech, Apr. 2013, 8 pages.
(Continued)

*Primary Examiner* — Liang Che A Wang
*Assistant Examiner* — Ayele F Woldemariam
(74) *Attorney, Agent, or Firm* — Conley Rose, P.C.

(57) ABSTRACT

Systems, methods, and devices for spatial adaptation with dynamic adaptive streaming are disclosed. In an embodiment, systems, methods and devices are disclosed for signaling a spatial relationship of one or more tiles in a tiled presentation with an attribute in a media presentation description. In other embodiments, systems, methods and devices are disclosed for server-managed adaptive streaming wherein a client generates and transmits a spatial adaptation URL query parameter to the server for free-zooming or free view-angle spatial adaptation to a region of interest.

17 Claims, 8 Drawing Sheets

(56) References Cited

U.S. PATENT DOCUMENTS

| | | | | |
|---|---|---|---|---|
| 8,645,562 | B2 * | 2/2014 | Thang | H04N 21/6125 709/231 |
| 8,806,050 | B2 * | 8/2014 | Chen | H04L 65/607 709/227 |
| 2004/0205513 | A1 | 10/2004 | Chen et al. | |
| 2007/0263900 | A1 | 11/2007 | Medasani et al. | |
| 2011/0305278 | A1 * | 12/2011 | Fablet | H04N 7/17336 375/240.12 |
| 2012/0324122 | A1 | 12/2012 | Miles et al. | |
| 2013/0124749 | A1 | 5/2013 | Thang et al. | |
| 2013/0166771 | A1 | 6/2013 | Thang et al. | |
| 2013/0195204 | A1 * | 8/2013 | Reznik | H04N 19/85 375/240.26 |
| 2013/0282876 | A1 * | 10/2013 | Watanabe | H04L 67/06 709/219 |

FOREIGN PATENT DOCUMENTS

| | | | |
|---|---|---|---|
| WO | 2012168365 | A1 | 12/2012 |
| WO | 2013098319 | A1 | 7/2013 |

OTHER PUBLICATIONS

"Spatially segmented content description", TNO, Apr. 2013, 12 pages.

"Information technology—Dynamic adaptive streaming over HTTP (DASH)—Part 1: Media presentation description and segment formats", ISO/IEC JTC 1/SC 29, Aug. 2, 2013, 150 pages.

Foreign Communication From a Counterpart Application, European Application No. 14829952.2, Partial Supplementary European Search Report dated Apr. 11, 2016, 7 pages.

Foreign Communication From a Counterpart Application, European Application No. 14829952.2, European Office Action dated Sep. 20, 2018, 7 pages.

Foreign Communication From a Counterpart Application, Chinese Application No. 2014800255719, Chinese Search Report dated Apr. 2, 2018, 2 pages.

Foreign Communication From a Counterpart Application, Chinese Application No. 2014800255719, Chinese Office Action dated Apr. 18, 2018, 4 pages.

* cited by examiner

SYSTEM AND METHOD FOR SPATIAL ADAPTATION IN ADAPTIVE STREAMING

CROSS-REFERENCE TO RELATED APPLICATION

This application claims priority under 35 USC 119(e) to U.S. provisional Application Ser. No. 61/858,911, filed on Jul. 26, 2013, and which is incorporated herein by reference.

TECHNICAL FIELD

The present disclosure relates to communications systems and methods and, in particular, to systems and methods for spatial adaptation in adaptive streaming.

BACKGROUND

Many television and movie viewers now desire on-demand access to video and other media content. As a first example, a television viewer may desire to watch a television show that he or she missed during the show's regular air time on television. The viewer may download the show on demand over the Internet via a web browser or other application on a notebook computer, tablet computer, desktop computer, mobile telephone or other device, then view that show in the browser or other application. In other examples, a viewer may download a movie on demand or may participate in a videoconference with other viewers.

Dynamic Adaptive Streaming over Hypertext Transfer Protocol (DASH) is a standard developed to provide such media content and is partially described in International Organization for Standardization (ISO)/International Electrotechnical Commission (IEC) 23009-1, First Edition, 2012 ("23009-1"), which is incorporated herein by reference in its entirety. In addition, ISO/IEC 23009-1, Technical Corrigendum 1, 2013 is incorporated herein by reference in its entirety. In DASH, there are two main devices: the Hypertext Transfer Protocol (HTTP) server(s) that provide the content and the DASH client that downloads the content and is associated with the viewer (or user). Currently, DASH leaves control with the client, which can request content using the HTTP protocol.

DASH functions to partition content (e.g., a video of potentially many minutes or hours of duration) into a sequence of smaller media segments—each segment being of a short interval of playback time. Each segment is made available to a DASH client in multiple alternatives—each at a different bit rate. As the content is played, the DASH client automatically selects a next segment (to be requested/played) from its alternatives. This selection is based on various factors, including current network conditions. The resulting benefit is that the DASH client can adapt to changing network conditions and play back content at a highest level of quality without stalls or rebuffering events.

DASH clients can be any devices with DASH and media content playing functionality having wireless and/or wireline connectivity. For example, a DASH client may be a desktop or laptop computer, smartphone, tablet, set-top box, televisions connected to the internet, and the like, etc.

Now referring to FIG. 1, there is illustrated a DASH standards-based adaptive media streaming model where portions of media streams and media segments are requested by DASH client devices 10*a*-10*n* using HTTP and are delivered by one or more DASH (HTTP) servers 12 via a network 11 (including the internet). As will be appreciated, the telecommunications network 11 may be any suitable network (or combinations of networks) enabling transmission of media content using HTTP. As an example only, the telecommunications network 11 is shown as including various telecommunications resources and infrastructures, such as network address translators and/or firewalls 18, caches 14 and Content Distribution Networks (CDNs) 16. These resources support on-demand, live streaming and time-shift applications and services to network-connected devices, such as the DASH clients 10*a*-10*n*.

Each DASH client 10 can dynamically adapt the bitrate of the requested media content/stream to changes in network conditions, by switching between different versions of the same media segment encoded at different bitrates.

As illustrated in FIG. 2, DASH is based on a hierarchical data model described by a Media Presentation Description (MPD), which defines formats to announce resource identifiers for a collection of encoded and deliverable versions of media content. The MPD is an XML document that advertises the available media and provides information needed by the DASH client in order to select segments from a Representation, make adaptation decisions, and retrieve segments from their servers via the network. Media content is composed of single or multiple contiguous segments.

The MPD provides sufficient information for the DASH client to provide a streaming service to the user by requesting segments from an HTTP (DASH) server and de-multiplexing (when needed), decoding and rendering the received media segments. The MPD is completely independent of media segments and only identifies the properties needed to determine whether a Representation can be successfully played and its functional properties (e.g., whether segments start at random access points).

As further illustrated in FIG. 2, a media segment is the minimal individually addressable unit of content data. It is the entity that can be downloaded using a URL advertised via the MPD. One example of a media segment is a 4-second part of a live broadcast, which starts at playout time 0:42:38, ends at 0:42:42, and is available within a 3-minute time window. Another example could be a complete on-demand movie, which is available for the whole period the movie is licensed.

A Representation defines a single encoded version of the complete asset, or of a subset of its components. For example, a Representation may be an ISO-BMFF containing unmultiplexed 2.5 Mbps 720p AVC video, and separate ISO-BMFF Representations may be for 96 Kbps MPEG-4 AAC audio in different languages. Conversely, a single transport stream containing video, audio and subtitles can be a single multiplexed Representation. For example, as a multiplexed Representation with multiple media components, an ISO BMFF file contains a track for 2.5 Mbps 720p AVC video and several tracks for 96 Kbps MPEG-4 AAC audio in different languages in the same file. A combined structure is possible: video and English audio may be a single multiplexed Representation, while Spanish and Chinese audio tracks are separate unmultiplexed Representations.

Spatial adaptation in adaptive streaming is about adaptation of streaming content in its spatial domain in terms of spatial objects, typically in response to changes in location, depth, shape and size of some regions of interest in its video component. Tiled adaptive streaming is a spatial adaptation technique that can minimize bandwidth usage by subdividing a video stream component into different levels of spatial objects, called "tiles", in its spatial domain, in addition to its temporal domain and quality levels into different representations of segments. A tile can be specified as a Representation of temporal segments of a certain level of quality for a sub-region of the video component. Given a finite amount of available bandwidth, a user can choose from downloading from a range of a large region in lower quality up to a very specific and small region in the highest quality possible. Tiled adaptive streaming is more fully described in "m28883 Spatially Segmented Content Description, MPEG#104, Incheon, April 2013" (incorporated herein by reference).

It is generally believed that dynamic adaptive streaming enabled by DASH ("m29232 Interactive ROI Streaming with DASH, MPEG#104, Incheon, April 2013", incorporated herein by reference) is largely driven and managed by the DASH client, whereas the server merely plays a Segment hosting role. For example, this may be seen from the Annex A ("Example DASH client behavior") of the DASH Part 1 specification, incorporated herein by reference.

In such a client-managed adaptive streaming (CMAS) system, it is the client that not only selects a set of Adaptation Sets and one specific Representation within each Adaptation Set and makes requests for Segments therein, but also makes decisions about Representation switching, updated MPD fetching, and encoder clock drift control. All these selections and decisions are intended to suit the client environment based on information provided in the MPD (e.g., @bandwidth of each selected Representations), static characteristics of the environment (e.g., client decoding and rendering capabilities), and dynamic characteristics that the client monitors about its changing environment (e.g., available bandwidth of the network connection).

Turning to FIG. 3, there is illustrated the architecture (functional block diagram) of a CMAS system having a conventional DASH client 200 interconnected with an HTTP (DASH) server, and further illustrating various function modules or components involved in the streaming process.

The Monitoring Function module (or component) 204 is responsible for collecting client environment information and generating/outputting some adaptation parameters, while the Adaptation Logic module (or component) 206 utilizes these parameters to make Representation selections and decisions.

While rather simple and straightforward, there are some issues with this pure CMAS system. For example, since DASH may not mandate client behavior, there may be no guarantee in presenting a coherent user experience of a same piece of streaming content across devices with different DASH client implementations. This may be undesirable, especially from the perspective of the content owners.

There may be difficulty in regulating the Adaptation Logic module 206 within the client 200 in a dynamic manner, for instance, according to how a service provider wants the content streamed to different classes of subscribers.

Further, it may be difficult to manage the streaming experience that depends on content itself. For example, for some portion of content that has details the content provider really wants the user to see, high-quality segments have to be streamed. This may be hard for the client 200 to maintain this kind of experience, without knowing content segments before requesting them.

Finally, as dynamic adaptation is to be managed by the client 200, the content information at all the levels including potential Periods, Adaptation Sets, Representations and Segments have to be prescribed in an MPD and communicated to the client prior to the time the client starts streaming. This becomes significant and may even be unresolvable when it comes to streaming dynamic events (e.g., emergency alerts); dynamic content, (e.g., live advertisement insertion); irregularly updated content (e.g., a basketball game with irregular time-outs); or a large, or even unlimited, number of potential Representations among which adaptation can happen dynamically (e.g., view angles and regions of interest (ROI) of a live event stream).

There is a need for adaptation in the spatial dimension, allowing the user to navigate content for his/her own interest, for instance, by selecting video content presented in different positions, view angles and regions of interest within an original video content. Moreover, as this kind of user navigation has a lot of freedom and is difficult to prescribe in MPDs, there is also a need for a client-driven but server-managed adaptive streaming system.

SUMMARY

According to an embodiment, there is provided systems, methods, and devices for tiled streaming by signaling the spatial relationship in a Media Presentation Description which may appear at the SubRepresentation, Representation or Adaptation Set level.

In an embodiment, there is provided systems, methods, and devices for free-zooming spatial adaptation and navigation with constant video quality employing a server managed adaptive streaming approach.

In an embodiment, there are provided systems, methods, and devices for free view-angle spatial adaptation and navigation with constant video quality employing a server managed adaptive streaming approach.

Additional features and advantages of the disclosure are set forth in the description which follows, and will become apparent from the description, or can be learned by practice of the principles disclosed herein by those skilled in the art.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
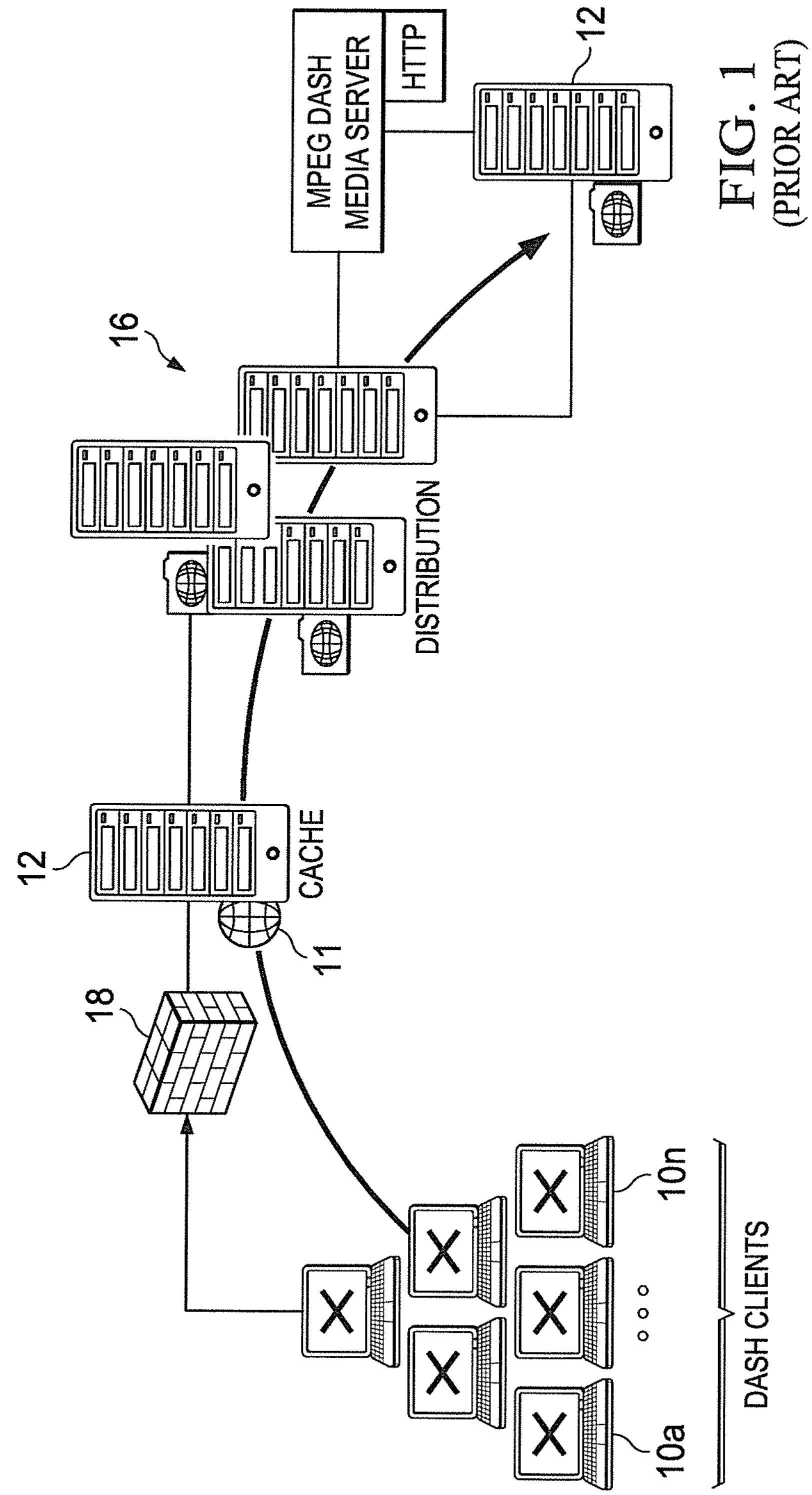
FIG. 1 illustrates a DASH standards-based dynamic adaptive media streaming system and its components.
Figure 2:
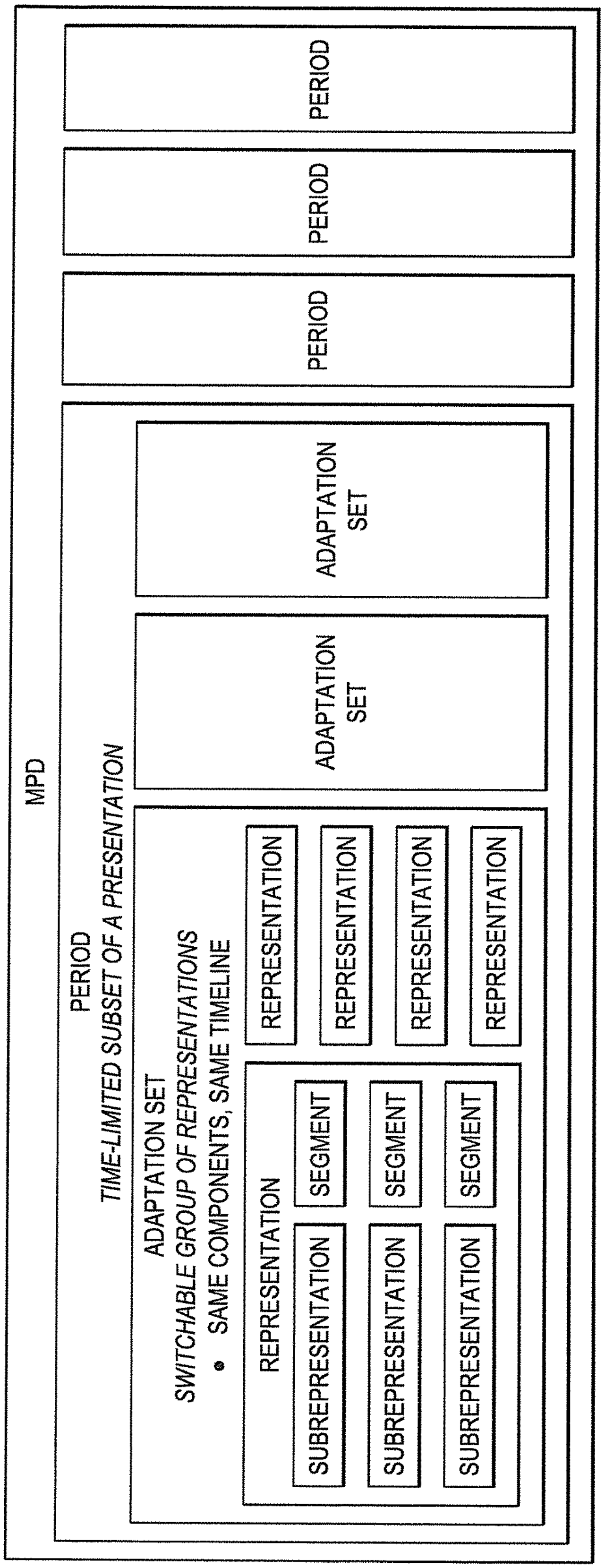
FIG. 2 illustrates conceptually the prior art hierarchical data model of the Media Presentation Description (MPD) within a DASH-based system.

The FIGURES and text below, and the various embodiments used to describe the principles of the present invention are by way of illustration only and are not to be construed in any way to limit the scope of the claimed invention. A person having ordinary skill in the art will readily recognize that the principles of the present invention may be implemented in any type of suitably arranged device or system. Specifically, while the present invention is described with respect to use in a cellular wireless environment, those will readily recognize other types of networks (e.g., wireless networks, wireline networks or combinations of wireless and wireline networks) and other applications without departing from the scope of the present disclosure.

Unless defined otherwise, all technical and scientific terms used herein have the same meaning as commonly understood by a PHOSITA to which this invention belongs. Although any methods and materials similar or equivalent to those described herein can also be used in the practice or testing of the present invention, a limited number of the exemplary methods and materials are described herein.

As will be appreciated, aspects of the present disclosure may be embodied as a method, system, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Field Programmable Gate Arrays (FPGAs), Application Specific Integrated Circuits (ASICs), Digital Signal Processors (DSPs) and general purpose processors alone or in combination, along with associated software, firmware and glue logic may be used to construct the present invention.

Furthermore, various aspects of the present disclosure may take the form of a computer program product on a computer-usable storage medium having computer-usable program code embodied in the medium. Any suitable computer usable or computer readable medium may be utilized. The computer-usable or computer-readable medium may be, for example but not limited to, a random access memory (RAM), a read-only memory (ROM), or an erasable programmable read-only memory (EPROM or Flash memory). Computer program code for carrying out operations of the present invention may be written in, for example but not limited to, an object oriented programming language, conventional procedural programming languages, such as the "C" programming language or other similar programming languages.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph.

As used herein, a "module," a "unit", an "interface," a "processor," an "engine," a "detector," or a "receiver," includes a general purpose, dedicated or shared processor and, typically, firmware or software modules that are executed by the processor. Depending upon implementation-specific or other considerations, the module, unit, interface, processor, engine, detector, or receiver, can be centralized or its functionality distributed and can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

Abbreviations used herein include UE for "User Equipment" such as a DASH client, eNodeB for "Evolved Node B" (aka as a base station) in LTE, and PGW for "Packet and Data Gateway".

Figure 4:
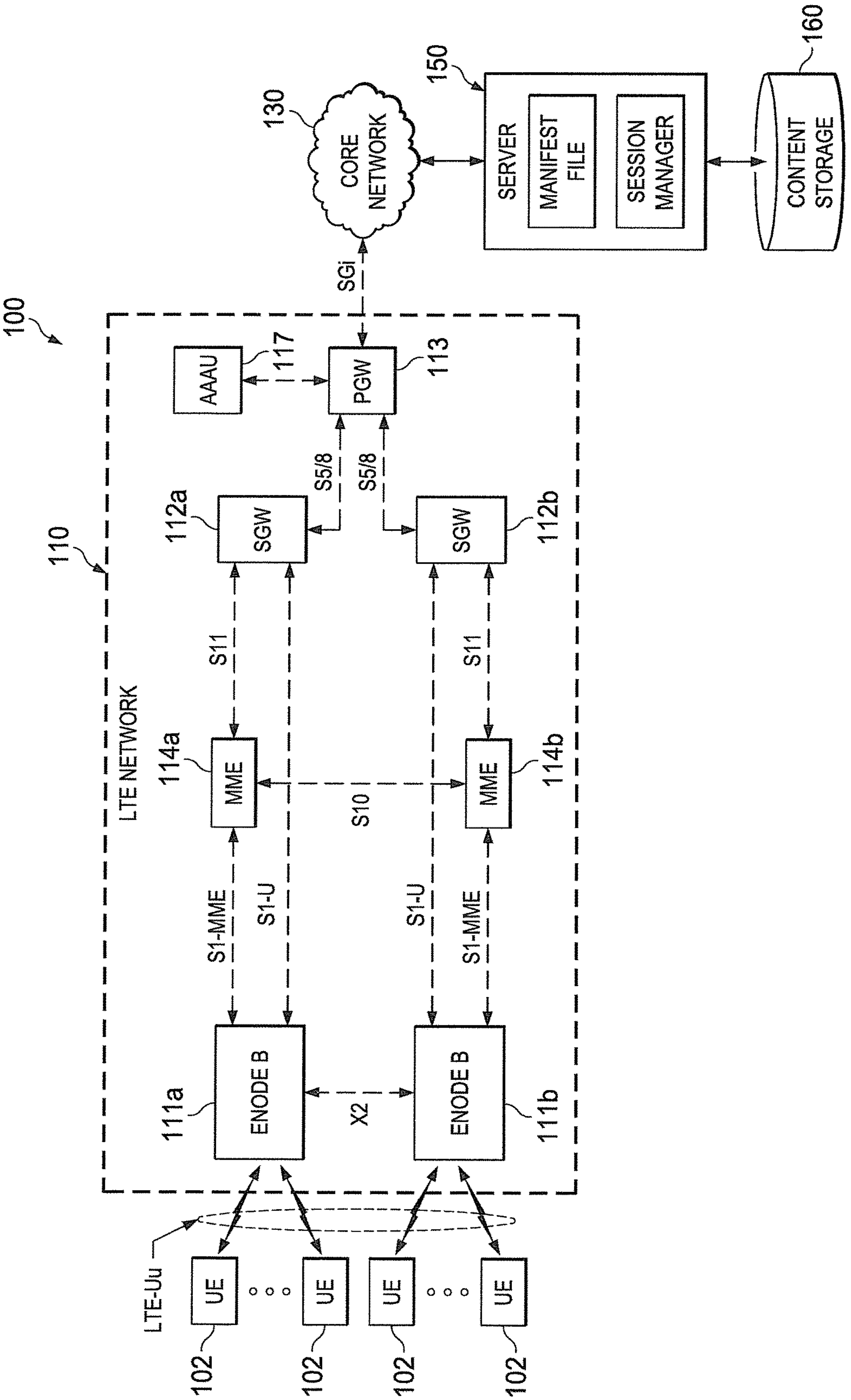
FIG. 4 is a block diagram of an exemplary system in accordance with the principles of the present disclosure.

Reference is now made to FIG. 4 depicting a block diagram of an exemplary wireless communication system supporting various embodiments of the present disclosure. While the exemplary wireless communication system is primarily discussed within the context of streaming media via a Long Term Evolution (LTE) network, a person of ordinary skill in the art informed by the teachings herein will realize that various embodiments are also well suited for use with other types of wireless networks, wireline networks or combinations of wireless and wireline networks. Further, the network 110 may function according to one or more protocols, standards and/or specifications (public or proprietary) enabling HTTP functionality.

FIG. 4 depicts an exemplary wireless communication system 100 that includes a plurality of User Equipment (UE) 102 (e.g., DASH clients 102), a Long Term Evolution (LTE) network 110, a core network 130, a content server 150 (e.g., an HTTP content server), and a content storage device 160. As will be appreciated, the number of each type of device in the network may be fewer and/or greater than shown, and the embodiment shown in FIG. 4 is for illustration only.

The LTE network 110 supports communications between the UEs 102 and the core network 130, such as communications for initiating content streaming sessions between the content server 150 and the UEs 102.

The UEs 102 are preferably wireless DASH client devices configured to access a wireless network, such as the LTE network 110. The UEs 102 are configured to support control signaling in support of bearer session(s) in the LTE network 110, and may be a phone, smartphone, PDA, laptop, computer, or any other wireless user device. The client devices could also be wireline connected devices with a wireline network interface if the access points are wireline based.

The structure and functionality of conventional UEs 102 (e.g., DASH clients) are well-known. These devices generally include various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional components and software processes (functionality) of these devices, other than as noted herein or relevant for an understanding of the present disclosure, is provided, as these are known to those of ordinary skill in the art. It will be understood that the UEs 102 may be constructed or configured from any suitable hardware, software, firmware, or combination thereof for providing the functionality known to those of ordinary skill in the art. The UEs 102 will include additional functionality as described below in accordance with one or more embodiments.

Configuration and operation of LTE network 110 are well understood by a PHOSITA. For illustrative but not limiting purposes, the exemplary LTE network 110 includes eNodeBs 111*a* and 111*a* (collectively, eNodeBs ill), Serving Gateways (SGWs) 112*a* and 112*b* (collectively, SGWs 112), a Packet Data Network Gateway (PGW) 113, Mobility Management Entities (MMEs) 114*b* and 114*b* (collectively, MMEs 114), and an Authentication unit (AAAU) 117. The eNodeBs 111 provide a radio access interface for UEs 102. The SGWs 112, PGW 113, MMEs 114, and AAAU 117, as well as other components which have been omitted for purposes of clarity, are configured to provide an Evolved Packet Core (EPC) network supporting end-to-end service delivery using IP.

The structure and functionality of the eNodeBs, SGWs, PGWs, MMEs and AAAU and other network components are generally well-known. These devices will typically include various components such as processing units, controllers and network interfaces, which necessarily include but are not limited to, microprocessors, microcontrollers, memory devices, and/or logic circuitry, and these may be adapted to implement various algorithms and/or protocols. No additional description of the conventional components and software processes (functionality) of these devices, other than as noted herein or relevant for an understanding of the present disclosure, is provided, as these are known to those of ordinary skill in the art.

As depicted in FIG. 4, each eNodeB 111 supports a respective plurality of UEs 102. The communication between the eNodeBs 111 and the UEs 102 is supported using LTE-Uu interfaces associated with each of the UEs 102. SGW 112*a* supports communications for eNodeB 111*a* and SGW 112*b* supports communications for eNodeB 111*a*. The communication between the SGWs 112 and the eNodeBs 111 is supported using respective S1-u interfaces. The S1-u interfaces support per-bearer user plane tunneling and inter-eNodeB path switching during handover.

The PGW 113 supports communications for the SGWs 112. The communication between PGW 113 and SGWs 112 is supported using respective S5/S8 interfaces. The S5 interfaces provide functions such as user plane tunneling and tunnel management for communications between PGW 113 and SGWs 112, SGW relocation due to UE mobility, and the like. The S8 interfaces, which may be Public Land Mobile Network (PLMN) variants of the S5 interfaces, provide inter-PLMN interfaces providing user and control plane connectivity between the SGW in the Visitor PLMN (VPLMN) and the PGW in the Home PLMN (HPLMN). The PGW 113 facilitates communications between LTE network 110 and core network 130 via a SGi interface.

The MMES 114 provide mobility management functions in support of mobility of UEs 102. MME 114*a* supports eNodeB 111*b* and the MME 114*b* supports eNodeB 111*b*. The communication between MMES 114 and eNodeBs 111 is supported using respective S1-MME interfaces, which provide control plane protocols for communication between the MMES 114 and the eNodeBs 111.

A Policy and Charging Rules Function node (PCRF) (not shown but which may be integrated with the AAAU 117) provides dynamic management capabilities by which the service provider may manage rules related to services provided via LTE network 110 and rules related to charging for services provided via LTE network 110.

As appreciated, the network 110 is exemplary and other suitable configurations or networks may be utilized.

The core network 130 may include one or more packet data networks (e.g., IP-based) via which UEs 102 may access content, services, and the like. Although the core network 130 is shown as a separate network from the LTE network 110, it will be understood that the specific networks 110 and 130 can also be collectively referred to as the network.

The HTTP server 150 is connected to the core network 130 and is configured to support the streaming content process as discussed herein. The HTTP server 150 may store content locally or remotely via, illustratively, a content storage device 160 in communication with the server 150.

The DASH client (UE) 102 sends HTTP requests over the LTE network 110 and IP network 130 to the server 150. As described in more detail below, the server 150 sends back HTTP responses to the DASH client 102 (e.g., media presentation description (MPD) files) containing media segments and other information such as the length of time, file size, play starting time, file storage site, media type, and resolution). In other embodiments, it is possible that MPDs may be received by the UE 102 from a network device other than the content server 150.

Figure 5A:
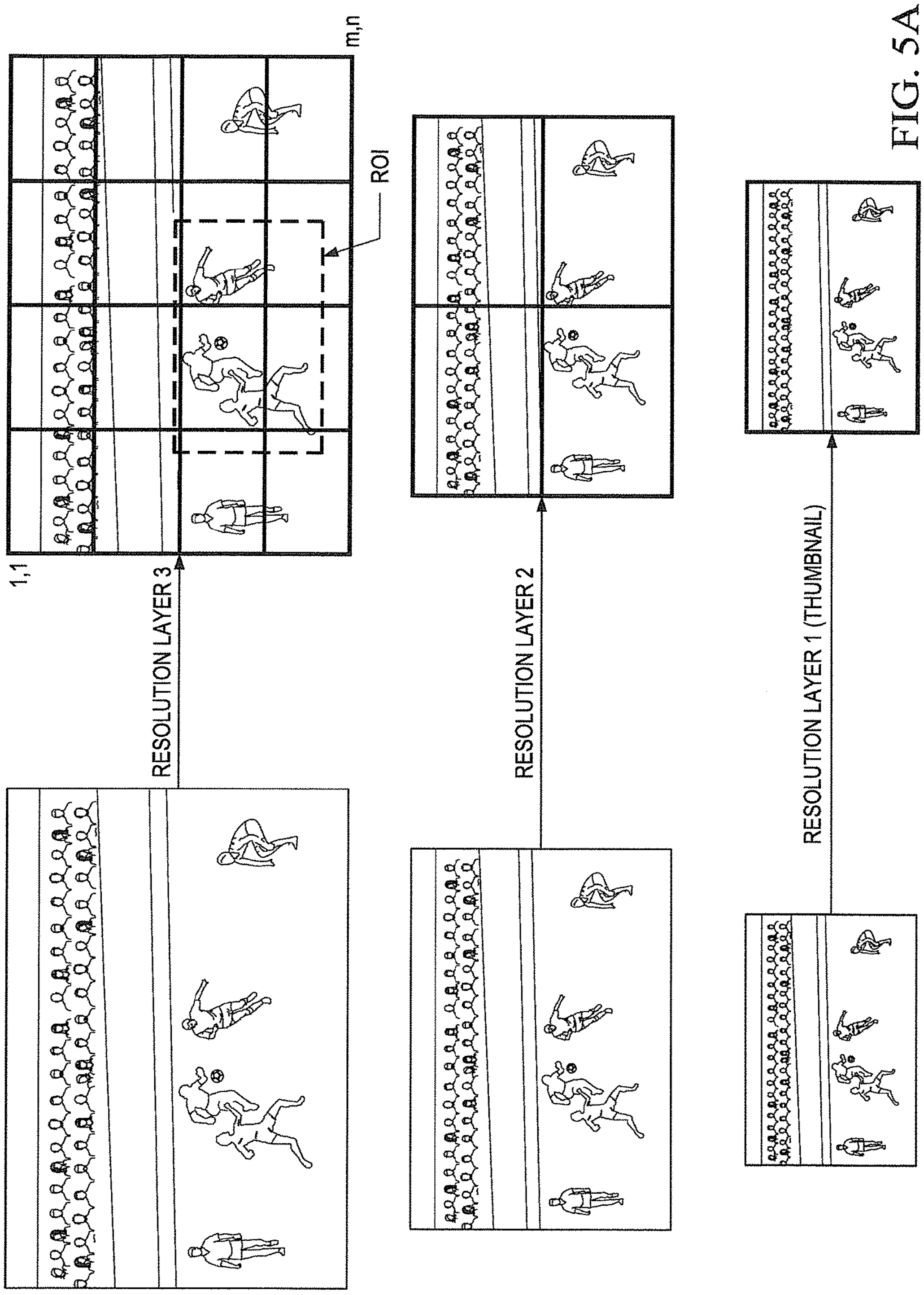
FIGS. 5A and 5B depict an exemplary tile adaptive streaming case.

Reference is now made to FIG. 5 depicting a spatially adaptive streaming example wherein multiple layers of video (e.g., resolution layers 1, 2 and 3) at various resolutions/sizes of the full-frame video (full panorama) are created, and then each layer is partitioned in equally sized spatial objects, namely tiles.

The client 102 starts streaming with the first version (Layer 1) of the media segment, e.g., the thumbnail-sized video. The media segment is augmented with spatial relationship information, e.g., tiling information for tiles, to indicate that a spatial adaptation access is possible. When clicking on a spatial object (e.g., tile), or when selecting a set of spatial objects (e.g., tiles), the DASH client 102 automatically switches to a Representation or Representations to stream only the selected spatial objects (e.g., tiles). Through user interactions, the DASH client 102 can dynamically switch back to the Representation for the full-frame video.

Depending on the region of interest (ROI) selected by the user, the client 102 determines the appropriate spatial objects (e.g., the layer as well as the necessary tiles) in order to recreate the view. When a smaller spatial object or a smaller number of spatial objects, with possibly lower quality/resolution, are streamed and displayed, the client 102 can function to download and decode the requested content at a lower bandwidth needed—as compared to the case where the full panorama is requested at the highest resolution.

In one embodiment, a new XML attribute "@pos" is provided for use in an MPD that is common to the SubRepresentation, Representation, or Adaptation Set, which is used to describe the position information of a spatial object within a division and overlay of all spatial objects. The new XML attribute "@pos" is described herein below for tiled representations.

| Element or Attribute Name **Common attributes and elements** | Use | Description |
|---|---|---|
| @pos | O | Specifies the spatial position of one or more Representations in a tiled presentation, in the form of a string comprising two pair of integers in parenthesis separated by '/', e.g., "(1, 2)/(4, 4)". The first number pair before the slash specifies the row number and column number of the Representation(s). The number pair after the slash specifies how the full view is split in horizontal and vertical direction. Note that the coordinate for the left top tile is (1, 1), and the coordinate for the right bottom tile is (m, n). If not present, the default is (1, 1)/(1, 1), i.e., an un-tiled representation(s). |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

The actual position of a tile can be determined using the values of XML attributes @pos, @width, @height etc. For example, for a tile with a coordinate (i, j), the left top point of the tile as presented on a display is calculated as (j−1)*width, (i−1)*height.

Panning or navigation among spatial objects is possible and allowed for adaptation or switching between Representations divided in the same way in space (i.e. division in any direction is the same). Zooming within spatial objects is possible and allowed for adaptation or switching between Representations if they are divided in any direction with the same proportion (ratio).

Figure 5B:
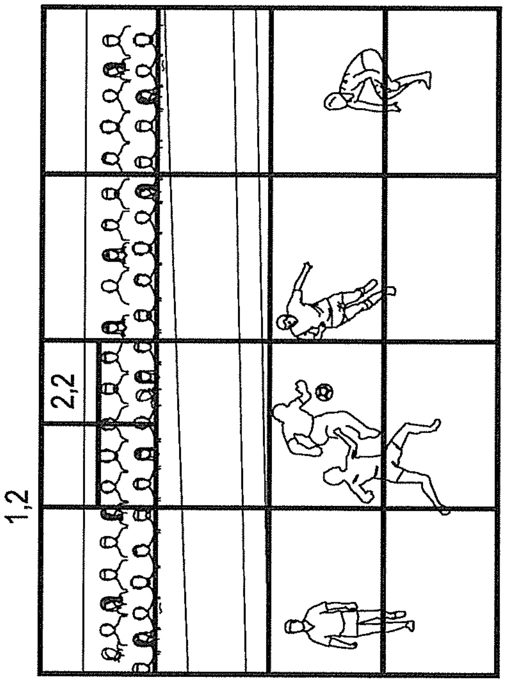

For example, referring to FIG. 5B, (1,2)/(2,2) is the second left top in the full reference space divided equally into two parts in the horizontal direction and two parts in the vertical direction. From the relative position, it is easy to know the relative position between two (tile) Representations, in particular they are neighbored in any direction.

When doing panning, a client can request the neighboring (tile) Representation in the direction instructed by the user.

When doing zooming, a client can request embedded/embedding (tile) Representations in the zooming direction instructed by the user.

The following is exemplary XML code for a MPD describing signaling the spatial relationship of Representations to the DASH client 102 in accordance with an embodiment of the present disclosure. The MPD describes five Adaptation Sets, one is for full view with an identifier "FV", and the other four include a 2×2 tiled view. The attribute @pos (denoted in bold below) is not present in the Adaptation Sets for full view, but is present in those for a tiled view. In the present example code, users can navigate among four tiled views and switch between the full view and any of the tiled views.

```
<MPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011 DASH-MPD.xsd"
profiles="urn:mpeg:dash:profile:full:2011"
minBufferTime="PT5.0S"
type="static"
mediaPresentationDuration="PT3256S">
  <BaseURL>http://www.example.com/server/Segments/</BaseURL>
  <Period start="PT0.00S" duration="PT3256S">
    <SegmentList duration='10'>
      <Initialization sourceURL='seg-init.mp4'/>
  </SegmentList>
  <!-Description of full-frame video -->
    <AdaptationSet id="FV" mimeType='video/mp4' codecs='hev1' >
      <Representation id='R0' width='1920' height='1080'
  frameRate='30' bandwidth='256000'>
        <SegmentList duration='10'>
        <SegmentURL media='seg-full-1.mp4'/>
        ...
      </SegmentList>
      </Representation>
    </AdaptationSet>
  <!-Description of first tile -->
  <AdaptationSet id="TV1" pos = "(1,1)/(2,2)" mimeType='video/mp4'
  codecs='hev1' >
    <Representation width='960' height='540' frameRate='30'
  bandwidth='64000'>
      <SegmentList duration='10'>
        <SegmentURL media='seg-tile1-1.mp4'/>
        ...
      </SegmentList>
    </Representation>
  </AdaptationSet>
  <!-Description of second tile -->
  <AdaptationSet id="TV2" pos = "(1,2)/(2,2)" mimeType='video/mp4'
  codecs='hev1' >
    <Role schemeIdUri="urn:mpeg:DASH:role:2011"
    value="alternate"/>
    <Representation width='960' height='540' frameRate='30'
  bandwidth='64000'>
      <SegmentList duration='10'>
        <SegmentURL media='seg-tile2-1.mp4'/>
        ...
      </SegmentList>
    </Representation>
  </AdaptationSet>
  <!-Description of third tile -->
  <AdaptationSet id="TV3" pos = "(2,1)/(2,2)" mimeType='video/mp4'
  codecs='hev1' >
    <Role schemeIdUri="urn:mpeg:DASH:role:2011"
    value="alternate"/>
    <Representation width='960' height='540' frameRate='30'
  bandwidth='64000'>
      <SegmentList duration='10'>
        <SegmentURL media='seg-tile3-1.mp4'/>
        ...
      </SegmentList>
    </Representation>
  </AdaptationSet>
  <!-Description of fourth tile -->
  <AdaptationSet id="TV4" pos = "(2,2)/(2,2)" mimeType='video/mp4'
  codecs='hev1' >
    <Role schemeIdUri="urn:mpeg:DASH:role:2011"
    value="alternate"/>
    <Representation width='960' height='540' frameRate='30'
  bandwidth='64000'>
      <SegmentList duration='10'>
        <SegmentURL media='seg-tile4-1.mp4'/>
        ...
      </SegmentList>
    </Representation>
  </AdaptationSet>
  </Period>
</MPD>
```

Below is described an example of spatial adaptation in free zoom in/out and navigation with constant video quality. A user watches a streaming soccer match first in a full-field view, and then zooms into a particular player and starts to follow his movement. After a while, the user zooms out and returns to the full-field view. To maintain the user's watching experience, it is desirable to maintain a constant video quality in all these views.

Since there are potentially a large number of possible representations of streams associated with possible regions of interest (ROI), using MPDs to prescribe these Representations is not practical.

In accordance with an embodiment, a server-managed adaptive streaming (SMAS) process and system are disclosed. Firstly described is an overview of the server-managed adaptive streaming embodiment, and then a specific implementation is disclosed based on an example use case.

Figure 6:
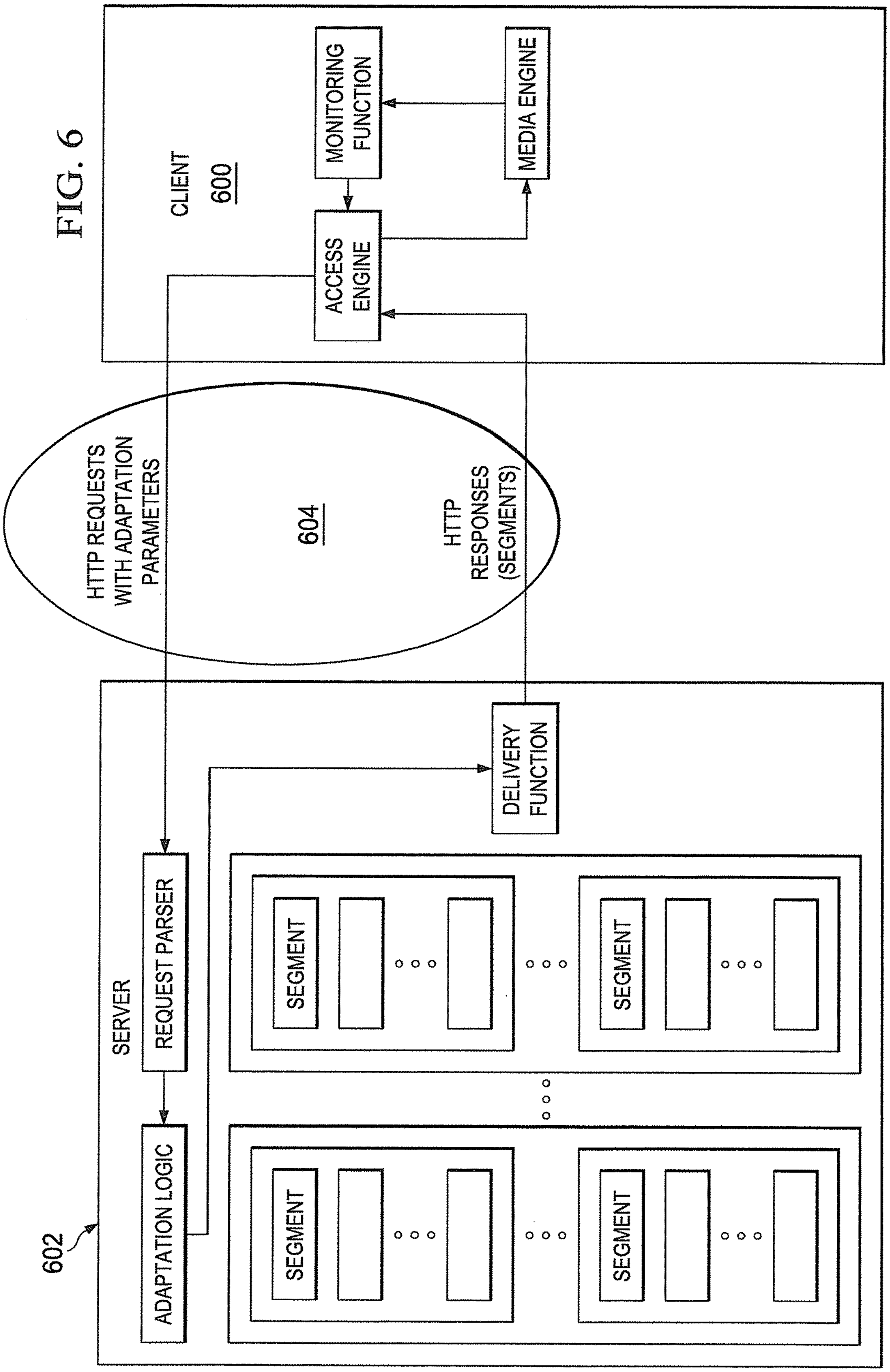
FIG. 6 is a block diagram of a server-managed adaptive streaming system in accordance with the principles of the present disclosure.

Reference is now made to FIG. 6 illustrating a server-managed adaptive streaming (SMAS) system for DASH, described more fully in "m28176 On Server-Managed Adaptive Streaming in DASH, MPEG2012, Geneva, January 2013" (incorporated herein by reference). The system leverages a multi-tier web architecture commonly seen in web applications equipped with server-side information processing capabilities. The SMAS system includes a client device 600 that gathers necessary adaptation parameters, similar to the CMAS approach depicted in FIG. 3, but the client 600 passes the adaptation parameters along with a media segment request to a content server 602 over the network 604. The server 602 determines the response it will generate based on the adaptation parameters received from the client 600. Additionally, instructions on what adaptation parameters are required or are optional for the client 600 to collect may be specified within the MPD sent by the server 602.

Figure 3:
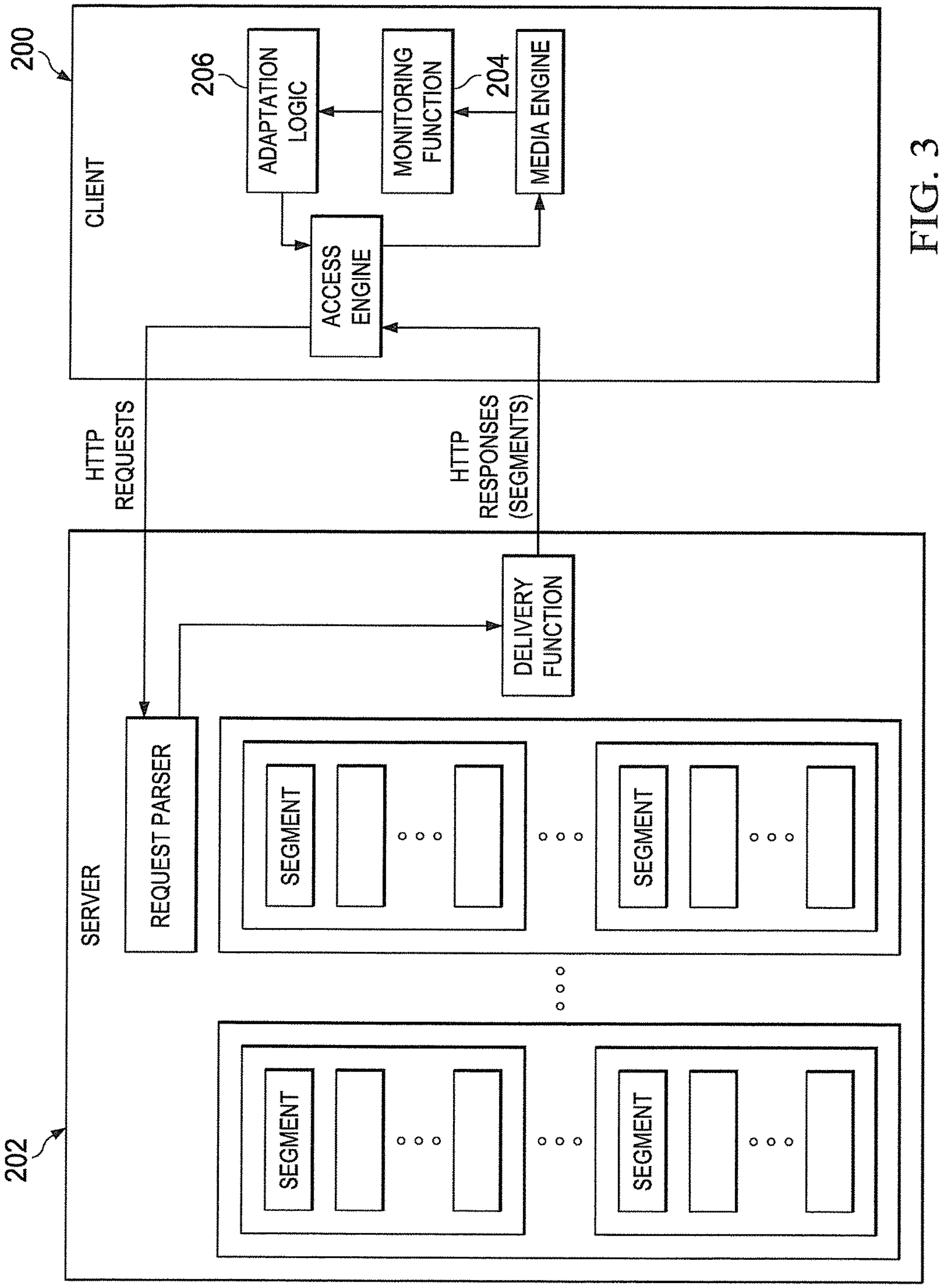
FIG. 3 is a functional block diagram illustrating a conventional client and server pair in a client-managed adaptive streaming system, such as DASH.

As will be appreciated, the client device (UE) 600 and the content server 602 are similar to (or may be the same as) the UE 102, 200 and the content server 150, 202, respectively, as illustrated in FIGS. 3 and 4, but with additional functionality as described herein.

In general terms, the SMAS approach moves the Adaptation Logic module (normally residing in the client device) to the content server. In this system, the client 600 make requests for segments by submitting adaptation parameters to the content server 602 which makes the segment selections and adaptation decisions. In other embodiments, the Adaptation Logic module may reside on a different server (network device) other than the server hosting the streaming segments. In yet some other embodiments, some of the Adaptation Logic module functions may be delegated to other servers (network devices) depending on specific applications, designs and deployments.

One exemplary embodiment for passing adaptation and other parameters from the client to the server in an SMAS is to use the solutions for the parameter insertion within media segment uniform resource locators (URLs) (as described in ISO/IEC 23009-1, Information technology—*Dynamic adaptive streaming over HTTP* (*DASH*)—*Part* 1: *Media presentation description and delivery formats*, and m28176, On Server-Managed Adaptive Streaming in DASH, 103rd MPEG meeting, Geneva, January 2013, both incorporated by reference), to specify what parameters the server 602 requires and optionally requires from the client 600 when it makes requests for media segments.

For example, the following adaptation parameters specified in the MPD and collected by the client can be sent to the server to provide a segment most suitable to the client environment:

Dynamic parameters: buffered media data, whose value can be measured in media time (e.g., 2.5 seconds); current bandwidth, whose value can be measured in bits per second (e.g., 500 kbps; time of media data to be requested, which is the start time of next segment (e.g., 10.02 s); the number of a segment to be requested (e.g., 25); and an ROI location and size (e.g., (x, y)=(100, 200) and (h-size, v-size)=(1000, 2000) in pixels).

Static parameters: display resolution: 800×480; codec capability: H.264 base profile level 3.1; maximum buffer size: 8 MB (Megabytes); component selected: Video+Audio; and language: Chinese.

This SMAS architecture and process is client-driven, but server-managed, as it is the client who initializes the media segment requests.

The present disclosure provides a spatial adaptation mechanism using various URL query parameters to pass information of a region of interest (ROI) that the user likes to adapt or switch to from the client to the server and allow the server to provide streaming content fitting to the ROI back to the client. In one embodiment, these URL query parameters are defined for the purpose of free-zooming spatial adaptation to a region of interest (ROI). Other parameters can be also defined in a similar way for other use cases (e.g., free view-angle spatial adaptation). Table 1 below illustrates exemplary but not exclusive spatial adaptation URL Query parameters:

TABLE 1

Spatial Adaptation URL Query Parameters

| Parameter Name | Format | Semantics |
|---|---|---|
| Spatial-Position | "x y" | A pair of un-signed integers, representing the (x, y)-position of the ROI. The origin is assumed to be '0 0" at the lowest left corner. If not specified, the default value is "0 0". |
| Spatial-Size | "h v" | A pair of un-signed integers, representing the horizontal and vertical size of the ROI. If not specified, the default value is the size of the full view. |
| Spatial-QualityRanking | "q" | An un-signed integer, representing a quality ranking of a region of interest. Similar to the attribute @qualityRanking specified in ISO/IEC 23009-1, Information technology - Dynamic adaptive streaming over HTTP (DASH) - Part 1: Media presentation description and delivery formats, lower values represent higher quality content of the ROI. If not specified, the default value is the value of this parameter for the full view (or equal to int(q0*(h*v)/(h0*v0))). |

In one example, assume that the full-field view has the spatial position (0, 0), spatial size (10240, 7680) and spatial quality ranking 100. The following portion of an MPD can be used to allow spatial adaptation, using the URL parameter insertion solution/process described in (m28174, "Contribution to DASH Core Experiment on Parameter Insertion in URL", 103rd MPEG meeting, Geneva, January 2013, incorporated herein by reference)

```
<BaseURL>http://cdn1.example.com/</BaseURL>
<URLParameter id="SegNumber" queryRequest="true"/>
<URLParameter id="AvailableBandwidth" queryRequest="true"/>
<URLParameter id="Spatial-Position" queryRequest="true"/>
<URLParameter id="Spatial-Size" queryRequest="true"/>
```

-continued

```
<URLParameter id="Spatial-QualityRanking" queryRequest="true"/>
<SegmentTemplate duration="4" startNumber="1" media="video.php"/>
```

With the MPD above, the client 600 constructs the following URL (and sends it to the server 602) to request for segment number 1 of the full-field view for available 8 Mbps network bandwidth:

http://cdn1.example.com/video.php?SegNumber=1&?AvailableBandwidth=80000000

If the user wants to zoom into a region of interest, for example, with Spatial-Position="100 100" and Spatial-Size="1024 768" and Spatial-QualityRanking=10, then the client 600 constructs the following URL (and sends it to the server 602) to request segment number 20 of the full view for an available 8 Mbps network bandwidth:

http://cdn1.example.com/video.php?SegNumber=20&?AvailableBandwidth=800000&?Spatial-Position="100 100"&?Spatial-Size="1024 768"&?Spatial-QualityRanking=10

The server 602 fulfills this request by returning a media segment with segment number 20 that fits the available bandwidth and the spatial adaptation needs. When the user later decides to return to the full-field view, the client 600 constructs the following URL from segment 50 on:

http://cdn1.example.com/video.php?SegNumber=50&?AvailableBandwidth=80000000

Figure 7A:
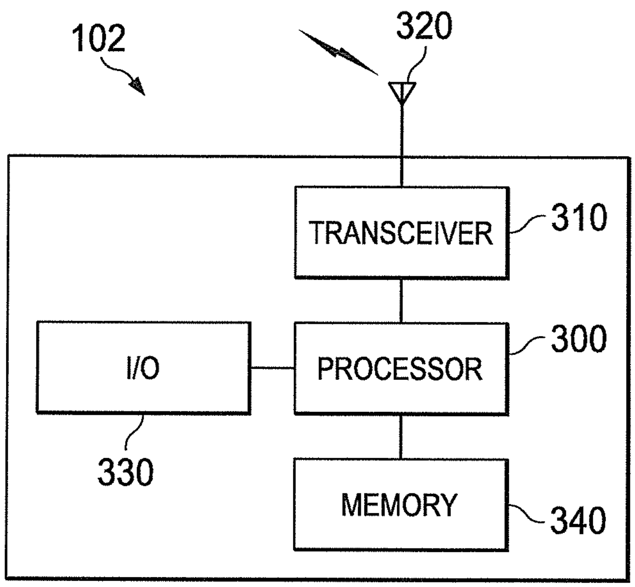
FIGS. 7A and 7B are overall block diagrams illustrating a client (or UE) and an eNodeB, respectively, shown in FIG. 4.

Turning now to FIG. 7A, there is shown an overall block diagram of an example UE 102, 200, and 600. The UEs represent devices utilized by a user or subscriber during communication sessions over/within the system 100. Each UE typically includes a processor, memory, a transceiver and an antenna and may be constructed or configured from any suitable hardware, software, firmware, or combination thereof for transmitting or receiving information over a network. These devices may further include an input/output device having a microphone and speaker to capture and play audio information, as well as a camera and/or a display to capture/display video information. As an example, the UE may be a telephone, videophone, computer, personal digital assistant, mobile phone, smartphone, tablet, or the like, etc.

In the illustrated embodiment, the UE includes a processor 300, a transceiver 310, an antenna element 320, one or more input/output devices 330 (e.g., speaker/microphone, keypad, display/touchpad) and memory 340. The UE may include one or more other components, devices, or functionalities (not shown). Herein, the UEs include the necessary functionality for operating as a DASH client.

The processor 200 may be a general purpose, special purpose or digital signal processor, and may be a plurality of processors or combination of such processors. The processor 300 includes functionality to perform signal coding, data processing, power control, input/output processing, and/or any other functionality enabling the UE to operate in the system 100. The processor 300 is coupled to the transceiver 310 which is coupled to the antenna element 320. It will be understood that the processor 300 and the transceiver 310 may be separate components or integrated together. Similarly, the antenna element 320 may be a single element or a number of elements (multiple antennas or elements).

The transceiver 310 is configured to modulate the data or signals for transmission by the antenna 320 and demodulate the data or signals received by the antenna 320.

The processor 300 is coupled to the one or more input/output devices 330 (including ports or busses) operable for inputting/outputting user data. In addition, the processor 300 is coupled to memory 330 operable for storing and retrieving data. Any suitable type of memory storage device may be included, such as random-access memory (RAM), read-only memory (ROM), hard disk, subscriber identity module (SIM) card, a memory stick, a secure digital (SD) memory card, and the like.

Other elements or devices that might be included within in the UE will not be described herein, unless necessary or relevant to an understanding of the present disclosure. Though illustrated as a wireless device, the UE may further include a network interface configured for wireline network connectivity to a wireline network access point.

Figure 7B:
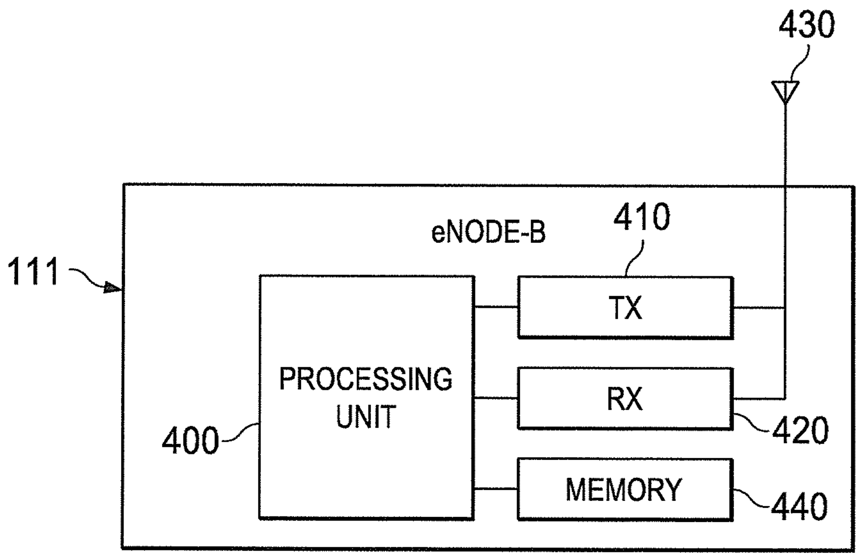

Now turning to FIG. 7B, there is a block diagram of an example eNodeB 111 having a processor 400, a transmitter 410, a receiver 420, an antenna 430 and memory 440. Additional suitable components or devices may be included (but not shown). The antenna 430 may include one or more antennas and/or one or more elements (multiple antennas or elements). The configuration and operation of the eNodeB 111 is readily known and understood by those of ordinary skill in the art, and no further description or explanation of its structure or operation is provided herein unless necessary for an understanding of the present disclosure or except for new or additional functionality described above. Though illustrated as a wireless device, in an embodiment in which the UE is wireline based, the eNodeB 111 may be a wireline-based network access point (such as a device operated by a network provider) and would include a network interface configured for wireline network connectivity to the UE.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An adaptive streaming system comprising:

a client configured to:

receive a media presentation description (MPD) indicating bandwidths associated with portions of media content, wherein the MPD indicates the bandwidths in representations in the MPD, and wherein a representation is a collection and encapsulation of one or more media streams in a delivery format and associated with descriptive metadata;

determine an available bandwidth associated with the client;

generate a set of Uniform Resource Locator (URL) query parameters for spatial adaptation to a region of interest (ROI) of the media content based on the bandwidths and the available bandwidth, wherein the client is a first hardware machine, and wherein the set is further for spatial adaptation to tiles neighboring the ROI in a direction instructed by a user when the user instructs panning; and transmit the set; and a server configured to:

receive the set from the client; and transmit segments of the media content to the client in response to the set, wherein the segments correspond to the ROI, wherein the server is a second hardware machine.

2. The system of claim 1, wherein the set is for free-zooming to the ROI.

3. The system of claim 2, wherein the set comprises a pair of un-signed integers representing x-position coordinates and y-position coordinates of the ROI.

4. The system of claim 2 wherein the set comprises a pair of un-signed integers representing a horizontal size and a vertical size of the ROI.

5. The system of claim 2, wherein the set comprises an un-signed integer representing a quality ranking of the ROI.

6. The system of claim 1, wherein the MPD indicates the bandwidths with respect to representations of the media content.

7. A method of adaptive streaming, the method comprising:

receiving, by a client, a media presentation description (MPD)) indicating bandwidths associated with portions of media content, wherein the MPD indicates the bandwidths in representations in the MPD, and wherein a representation is a collection and encapsulation of one or more media streams in a delivery format and associated with descriptive metadata;

determining, by the client, an available bandwidth associated with the client;

generating, by the client, a set of Uniform Resource Locator (URL) query parameters for spatial adaptation to a region of interest (ROI) of the media content based on the bandwidths and the available bandwidth, and wherein the set is further for spatial adaptation to tiles neighboring the ROI in a direction instructed by a user when the user instructs panning;

transmitting, by the client, the set to a server;

receiving, by the server, the set from the client; and transmitting, by the server, segments of the media content to the client in response to the set, wherein the segments correspond to the ROI.

8. The method of claim 7, wherein the set comprises a pair of un-signed integers representing x-position coordinates and y-position coordinates of the ROI.

9. The method of claim 7, wherein the set comprises a pair of un-signed integers representing a horizontal size and a vertical size of the ROI.

10. The method of claim 7, wherein the set comprises an un-signed integer representing a quality ranking of the ROI.

11. The method of claim 7, wherein the set is for free-zooming to the ROI.

12. The method of claim 7, wherein the MPD indicates the bandwidths with respect to representations of the media content.

13. An apparatus comprising:

a receiver configured to receive a media presentation description (MPD) indicating bandwidths associated with portions of media content, wherein the MPD indicates the bandwidths in representations in the MPD, and wherein a representation is a collection and encapsulation of one or more media streams in a delivery format and associated with descriptive metadata;

a processor coupled to the receiver and configured to:

determine an available bandwidth associated with the apparatus; and generate a set of Uniform Resource Locator (URL) query parameters for spatial adaptation to a region of interest (ROI) of the media content based on the bandwidths and the available bandwidth, and wherein the set is further for spatial adaptation to tiles neighboring the ROI in a direction instructed by a user when the user instructs panning; and a transmitter coupled to the processor and configured to transmit the set to a server, wherein the apparatus is a client.

14. The apparatus of claim 13, wherein the apparatus is a Dynamic Adaptive Streaming over Hypertext Transfer Protocol (DASH) client, and wherein the server is a DASH server.

15. The apparatus of claim 13, wherein the receiver is further configured to receive, from the server in response to the set, segments of the media content, wherein the segments correspond to the ROI.

16. The apparatus of claim 13, wherein the set is for free-zooming to the ROI.

17. The apparatus of claim 16, wherein the set comprises a pair of un-signed integers representing x-position coordinates and y-position coordinates of the ROI.

* * * * *